United States Patent
Waldron et al.

(10) Patent No.: US 11,198,824 B2
(45) Date of Patent: Dec. 14, 2021

(54) SYSTEM AND METHOD FOR LIQUID HYDROCARBON DESULFURIZATION

(71) Applicant: Alternative Petroleum Technologies, Inc., Reno, NV (US)

(72) Inventors: Jack Lawrence Waldron, Reno, NV (US); Kylen J. Smith, Reno, NV (US); Fred P. Buckingham, Houston, TX (US)

(73) Assignee: Alternative Petroleum Technologies Holdings Corp., Auburn, WA (US)

( * ) Notice: Subject to any disclaimer, the term of this patent is extended or adjusted under 35 U.S.C. 154(b) by 0 days.

(21) Appl. No.: 16/877,348

(22) Filed: May 18, 2020

(65) Prior Publication Data

US 2020/0362252 A1    Nov. 19, 2020

Related U.S. Application Data

(60) Provisional application No. 62/848,910, filed on May 16, 2019.

(51) Int. Cl.
| | |
|---|---|
| *C10G 53/14* | (2006.01) |
| *B01J 19/24* | (2006.01) |
| *C10G 31/08* | (2006.01) |
| *C10G 27/12* | (2006.01) |

(52) U.S. Cl.
CPC ............ *C10G 53/14* (2013.01); *B01J 19/245* (2013.01); *C10G 27/12* (2013.01); *C10G 31/08* (2013.01); *B01J 2219/0004* (2013.01); *B01J 2219/00006* (2013.01); *B01J 2219/00033* (2013.01); *B01J 2219/00038* (2013.01)

(58) Field of Classification Search
USPC ...... 208/220, 217, 213, 219; 196/14.52, 155
See application file for complete search history.

(56) References Cited

U.S. PATENT DOCUMENTS

| | | | | |
|---|---|---|---|---|
| 3,163,593 A | * | 12/1964 | Rigby | C10G 27/04 208/240 |
| 6,171,478 B1 | * | 1/2001 | Cabrera | C10G 67/12 208/196 |
| 6,596,914 B2 | * | 7/2003 | Gore | C10G 21/16 208/211 |
| 7,314,545 B2 | * | 1/2008 | Karas | C10G 53/14 208/208 R |
| 7,758,745 B2 | * | 7/2010 | Cheng | C10G 27/04 208/213 |
| 8,574,428 B2 | * | 11/2013 | Schucker | C10G 45/02 208/208 M |
| 10,214,697 B2 | * | 2/2019 | Gargano | C10G 29/02 |
| 10,703,995 B2 | * | 7/2020 | Waldron | C10G 31/06 |
| 10,927,306 B2 | * | 2/2021 | Waldron | C10G 27/12 |

(Continued)

*Primary Examiner* — Nina Bhat
(74) *Attorney, Agent, or Firm* — The Watson IP Group, PLC; Jovan N. Jovanovic

(57) ABSTRACT

A system for processing fuel to remove sulfur species through the oxidation of the sulfur species is described which includes one or more (and preferably two or more processing units). Additionally, a method of removing sulfur species through the oxidation of the sulfur species is also described. The system and the method rely on the use of aqueous feed and does not require the removal (through sorption or the like) at each or between each processing unit. Such a configuration for numerous reasons is economically advantageous.

20 Claims, 1 Drawing Sheet

(56) References Cited

U.S. PATENT DOCUMENTS

| | | | |
|---|---|---|---|
| 2007/0227950 A1* | 10/2007 | Martinie | C10L 3/10 208/217 |
| 2009/0065399 A1* | 3/2009 | Kocal | C10L 1/08 208/229 |
| 2009/0236266 A1* | 9/2009 | Cheng | C10G 27/04 208/213 |
| 2009/0242459 A1* | 10/2009 | Soloveichik | C10G 21/003 208/213 |
| 2011/0203972 A1* | 8/2011 | Gargano | C10G 27/04 208/236 |
| 2011/0022666 A1* | 9/2011 | Koseoglu et al. | C10G 61/02 208/97 |
| 2011/0233110 A1* | 9/2011 | Koseoglu et al. | C10G 69/02 208/60 |
| 2012/0018350 A1* | 1/2012 | Lin et al. | C10G 29/20 208/236 |
| 2014/0229512 A1* | 10/2014 | Gargano et al. | C10G 27/00 208/223 |
| 2014/0299512 A1 | 10/2014 | Gargano et al. | |
| 2014/0353212 A1* | 12/2014 | Tyler et al. | C10G 27/14 208/200 |
| 2015/0210949 A1* | 7/2015 | Lott et al. | C10L 10/12 208/1 |
| 2016/0024399 A1* | 1/2016 | Gargano et al. | C10G 53/14 208/200 |
| 2017/0190990 A1* | 7/2017 | Koseoglu et al. | C10G 53/14 208/200 |
| 2018/0265788 A1 | 9/2018 | Waldron | |
| 2018/0371333 A1 | 12/2018 | Waldron et al. | |

* cited by examiner

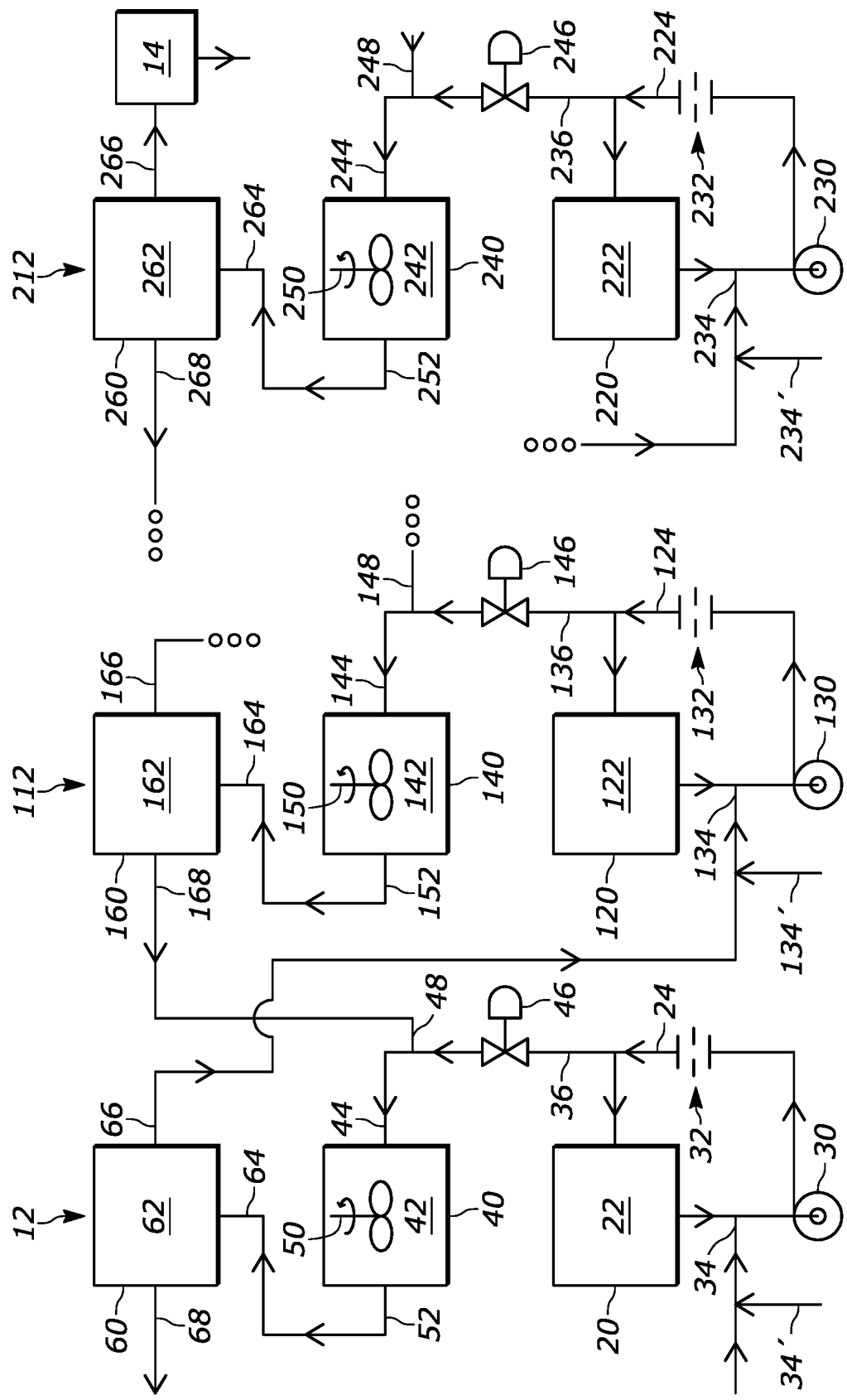

SYSTEM AND METHOD FOR LIQUID HYDROCARBON DESULFURIZATION

CROSS-REFERENCE TO RELATED APPLICATION

This application claims priority from U.S. Provisional Patent Application Ser. No. 62/848,910 filed May 16, 2019, entitled "System And Method For Liquid Hydrocarbon Desulfurization", the entire specification of which is hereby incorporated by reference.

BACKGROUND OF THE DISCLOSURE

1. Field of the Disclosure

The disclosure relates in general to liquid hydrocarbon desulfurization, and more particularly, to a system and method for the oxidation of sulfur compounds in liquid hydrocarbons.

2. Background Art

The Environmental concerns continue to increase with the increased use of hydrocarbon fuels, and have increased considerably with the use of these fuels in areas of the world where environmental regulations may not be as advanced as there are in other global locations.

One pollutant of hydrocarbon fuels is Sulfur, generally found in organic compounds such as thiophenes. Once combusted it becomes oxidized, that, when present in the atmosphere, has several deleterious effects. One of these effects is being a component of acid rain. Traditionally, the sulfur content of liquid hydrocarbons has been reduced by hydro-desulfurization, a process that requires relatively high temperatures and pressures in the presence of hydrogen gas to function economically. However, this technology is relatively costly, time consuming and expensive, which, in turn, limits the ability to rapidly assist countries in reducing Sulfur emissions.

Other methods have been developed for desulfurization. One of which is oxidative desulfurization, and another is bio oxidation. There are also drawbacks with these processes; overall they are promising. Among other drawbacks with oxidative desulfurization, it is difficult to efficiently use the reagents used during the oxidation step. The oxidizer is consumed in the reaction, and is quite costly. While in some systems, the oxidizer can be recycled, it remains difficult. Furthermore, there are operational issues associated with its implementation.

While the prior art is replete with patents directed to oxidative desulfurization, it has remained difficult to develop industrial processes for such innovations. Among other such prior art patents are U.S. Pat. No. 3,163,593 issued to Webster; U.S. Pat. No. 8,574,428 issued to Schucker; U.S. Pat. No. 7,758,745 issued to Cheng; U.S. Pat. No. 7,314,545 issued to Karas; U.S. Pat. No. 7,774,749 issued to Martinie; U.S. Pat. No. 6,596,914 issued to Gore; PCT Pub. No. WO2013/051202 published to Ellis and EP. App. Pub NO. 0482841 issued to Collins. Each of the foregoing patents is incorporated herein in its entirety.

Additionally, this application is related to, but does not claim priority from, U.S. Pat. App. Ser. No. 62/623,562 filed Jan. 30, 2018, entitled "System and Method for Liquid Hydrocarbon Desulfurization," and U.S. Pat. App. Ser. No. 62/471,159 filed Mar. 14, 2017, entitled "System and Method for Liquid Hydrocarbon Desulfurization" and U.S. Pat. App. Ser. No. 62/524,816 filed Jun. 26, 2017, entitled "System and Method for Liquid Hydrocarbon Desulfurization", the entire disclosure of each of the foregoing application is incorporated herein by reference in their entirety.

SUMMARY OF THE DISCLOSURE

The disclosure is directed, in one aspect to disclosure, to a method of liquid hydrocarbon desulfurization comprising the steps of: providing a first processing unit and a second processing unit, each processing unit having a reactor, a mixer and a separator, wherein the reactor is placeable in fluid communication with the mixer, and the mixer is in fluid communication with the separator; introducing a liquid hydrocarbon having a sulfur content into the reactor of the first processing unit; introducing an aqueous feed into the reactor of the first processing unit; mixing the liquid hydrocarbon with the aqueous feed in the reactor to form a first mixture; oxidizing at least some of the sulfur content in the liquid hydrocarbon within the reactor of the first processing unit; moving the liquid hydrocarbon and aqueous feed from the reactor to the mixer of the first processing unit; adding an additional aqueous feed to the mixer of the first processing unit; mixing the liquid hydrocarbon, aqueous feed and the additional aqueous feed in the mixer to form a second mixture; moving the second mixture to the separator of the first processing unit; separating the liquid hydrocarbon from the aqueous feed in the first processing unit; directing the liquid hydrocarbon to the reactor of the second processing unit; introducing an aqueous feed into the reactor of the second processing unit; mixing the liquid hydrocarbon with the aqueous feed in the reactor to form a third mixture; oxidizing at least some of the sulfur content in the liquid hydrocarbon within the reactor of the second processing unit; moving the liquid hydrocarbon and aqueous feed from the reactor to the mixer of the second processing unit; adding an additional aqueous feed to the mixer of the second processing unit; mixing the liquid hydrocarbon, aqueous feed and the additional aqueous feed in the mixer to form a fourth mixture; moving the fourth mixture to the separator of the second processing unit; and separating the liquid hydrocarbon from the aqueous feed in the second processing unit.

In some configurations, the step of adding an additional aqueous feed to the mixer of the first processing unit further comprises the step of adding an additional aqueous feed to the mixer of the first processing unit from the separator of the second processing unit.

In some configurations, the aqueous feed further comprises a metal ion.

In some configurations, the oxidant further comprises at least one of hydrogen peroxide, an organic peroxide, meta-chloroperoxybenzoic acid, a solid oxidizer, and Oxone.

In some configurations, the liquid hydrocarbon travels from the first processing unit to the second processing unit while the additional aqueous travels from the second processing unit to the first processing unit.

In some configurations, the steps of introducing the liquid hydrocarbon and the steps of removing the first and third mixtures occur continuously.

In some configurations, the method further includes the step of providing additional oxidant to the reactor of the second processing unit.

In some configurations, the reactor of the first processing unit and the reactor of the second processing unit each include a recirculation loop.

In some configurations, the method further includes the steps of removing the oxidized sulfur from the liquid hydrocarbon after the step of separating the liquid hydrocarbon from the aqueous feed in the second processing unit.

In some configurations, the liquid hydrocarbon provided to the reactor of the first processing unit has a sulfur content of in excess of 100 ppm.

In some configurations, the liquid hydrocarbon provided to the reactor of the first processing unit has a sulfur content of in excess of 900 ppm.

In another aspect of the disclosure, the disclosure is directed to a method of liquid hydrocarbon desulfurization comprising the steps of:—providing a first processing, a last processing unit and at least one intermediate processing unit, each of the first, last and at least one intermediate processing units having a reactor, a mixer and a separator; providing an aqueous feed to each of the processing units; providing a liquid hydrocarbon having a sulfur content to the first processing unit; sequentially moving the liquid hydrocarbon successively through the at least one intermediate processing unit and through the last processing unit; adding additional aqueous feed to the mixer of at least one of the processing units; oxidizing at least some of the sulfur content in each of the processing units; and removing the oxidized sulfur from the liquid hydrocarbon after the last processing unit.

In some configurations, the step of adding additional aqueous feed comprises the step of adding additional aqueous feed to each of the processing units.

In some configurations, the step of adding additional aqueous feed comprises the step of sequentially moving the additional aqueous feed from the last processing unit through the at least one intermediate processing unit and through the first processing unit.

In some configurations, the step of adding an oxidizer to the reactor of at least one of the first processing unit, the last processing unit and the at least one intermediate processing unit.

In some configurations, the step of removing the oxidized sulfur occurs only with liquid hydrocarbon that is removed from the last processing unit.

In some configurations, oxidized sulfur is not removed from the liquid hydrocarbon between the first processing unit, the at least one intermediate processing unit and the last processing unit.

In yet another aspect of the disclosure, the disclosure is directed to a method of processing a liquid hydrocarbon desulfurization comprising the steps of: providing a first processing unit and a second processing unit, each processing unit having a reactor, a mixer and a separator, wherein the reactor is placeable in fluid communication with the mixer, and the mixer is in fluid communication with the separator; introducing a liquid hydrocarbon having a sulfur content into the reactor of the first processing unit; introducing an aqueous feed into the reactor of the first processing unit; mixing the liquid hydrocarbon with the aqueous feed in the reactor to form a first mixture; oxidizing at least some of the sulfur content in the liquid hydrocarbon within the reactor of the first processing unit; moving the liquid hydrocarbon and aqueous feed from the reactor to the mixer of the first processing unit; adding an additional aqueous feed to the mixer of the first processing unit; mixing the liquid hydrocarbon, aqueous feed and the additional aqueous feed in the mixer to form a second mixture; moving the second mixture to the separator of the first processing unit; and separating the liquid hydrocarbon from the aqueous feed in the first processing unit.

In still another aspect of the disclosure, the disclosure is directed to a system for liquid hydrocarbon desulfurization comprising at least two processing units. Each processing unit further includes a reactor, a mixer and a separator. The reactor has a reactor inlet, a reactor outlet and a reactor mixing member. The mixer has a mixer inlet, a mixer outlet and a second mixing member. The separator has a separator inlet, a separator aqueous outlet and a separator fuel outlet. The reactor outlet is in fluid communication with the mixer inlet and the mixer outlet is in fluid communication with the separator inlet. The separator aqueous outlet of a second of the at least two processing units is in fluid communication with the mixer inlet of the first of the at least two processing units and the separator fuel outlet of a first of the at least two processing units is in fluid communication with the reactor inlet of the first of the at least two processing units.

In some configurations, a flow control valve is positioned between the reactor outlet and the mixer inlet of each of the at least two processing units.

In some configurations, the reactor mixing member further includes a recirculation loop, the recirculation loop having a shear mixer.

In some configurations, the system further comprises a oxidized sulfur remover having an inlet which is in fluid communication with the separator fuel outlet of the second of the at least two processing units.

In some configurations, the separator aqueous outlet of the first of the at least two processing units is in fluid communication with the mixer inlet of the second of the at least two processing units.

BRIEF DESCRIPTION OF THE DRAWINGS

The disclosure will now be described with reference to the drawings wherein:

FIG. 1 of the drawings is a schematic representation of the system of the present disclosure, while providing additional disclosure as to the method of operation of the same.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and, in particular to FIG. 1, liquid hydrocarbon desulfurization system is shown generally at 10. The desulfurization system is configured to remove sulfur content from liquid hydrocarbons, such as, for example, kerosene, diesel, fuel oil, jet fuel, gasoline, among others. The system is not limited to use with any particular type of liquid hydrocarbon. Additionally, it is contemplated that the system can lower the sulfur content to below 15 ppm, to for example 2 ppm, or less. Often times, the starting hydrocarbon has a sulfur content that can be 1500 or higher, while the system is contemplated for use with starting liquid hydrocarbon that is in excess of 15 ppm, and generally in excess of 100 ppm, 200 ppm, 300 ppm, 400 ppm, 500 ppm, 600 ppm, 700 ppm, 800 ppm, 900 ppm, and on upwards of 1500 ppm or greater. Again, the system is not limited to use with any particular hydrocarbon, or a hydrocarbon with any particular sulfur content.

The processing unit utilizes an aqueous feed. The aqueous feed may comprise any number of different formulations. In some configurations, the aqueous feed may comprise combinations of an organic acid, an oxidizer (also referred to herein as an oxidant), a strong acid, a metal ion (preferably, highly oxidized) and, optionally, an ionic liquid. The particular ratios can be varied depending on the particular fuel type and the composition thereof. The organic acid may comprise any one of the following, without limitation, acetic, formic, benzoic, or other acid of the carboxylic family, as well as mixtures of the same. The oxidizer (oxidant) may include peroxide which can be hydrogen peroxide or an organic peroxide, such as meta-chloroperoxybenzoic acid, or a solid oxidizer such as Oxone. The strong acid can be either sulfuric or nitric. The metal ion may be Iron ions, Magnesium ions, among others, either singly or in combination. The foregoing metal ions, oxidant, acids and other constituents is not exhaustive, but are illustrative examples, as one of ordinary skill having the present disclosure would understand variations to the materials within the scope of the disclosure. Additionally, the disclosure is not limited to these particular acids. Additionally, it is contemplated that an ionic liquid may be fully omitted from some configurations.

The desulfurization system includes at least one processing unit, such as processing unit 12 and oxidized sulfur species removal unit 14. It will be understood that the system is shown with three processing units, while it is contemplated that a greater or lesser number of processor units may be required to achieve the desired reduction of sulfur content from the liquid hydrocarbon. In the configuration shown, the processing units disclosed include an initial processing unit 12, a central processing unit 112 and a final processing unit 212. The system is configured for continuous desulfurization of liquid hydrocarbons, while it is contemplated that the system can be adapted to a batch process. It is contemplated that the system disclosed can process at a rate of 10 gallons per minute and can reduce the sulfur content from approximately 1500 ppm to less than 15 ppm. Of course, the system can be scaled larger or smaller, and can be configured to have different reductions in sulfur content, as well as different starting sulfur content and ending content. Additionally, the system can be configured to handle a number of other liquid hydrocarbons which may require variation to the system.

Each processing unit can be configured substantially identically although variations are contemplated. An exemplary processing unit is shown at 12. The processing unit 12 comprises reactor 20, mixer 40 and separator 60. The reactor 20, in the configuration shown, comprises a vessel defining cavity 22. The reactor 20 further includes recirculation loop 24 that has pump 30, shear device 32, inlet (for fuel and oxidant) 34 and outlet 36. In the configuration shown, the shear mixer may be a shear plate of the type disclosed in U.S. Pat. No. 8,192,073 entitled "Mixing Apparatus and Method for Manufacturing an Emulsified Fuel" issued Jun. 5, 2012, the entire disclosure of which is incorporated herein by reference in its entirety. The recirculation loop is in fluid communication with the cavity 22 where the pump 30 drives the constituents within the cavity 22 from the inlet 34 through the shear device 32 and through the outlet 36 directed back into cavity 22 to insure that the constituents are well mixed therein. It will be understood that the retention time in the reactor may be varied from, for example, 5 minutes to 20 minutes (although lower and higher retention times are contemplated) at temperatures ranging from 50° C. to 90° C. (while both higher and lower temperatures are contemplated) at pressures from atmospheric pressure to 2-3 bar (although higher pressures and lower pressures are contemplated). The recirculation rate is sufficient to maintain adequate mixing and substantially complete volume exchange in the reactor every 2 to 5 minutes (while variations are contemplated). Of course, these times, pressures, and temperatures are exemplary and not to be deemed limiting.

The mixer 40, in the configuration shown, comprises a vessel defining cavity 42. The mixer 40 further includes inlet 44 and outlet 52 that are in fluid communication with the mixer cavity 42. The mixer 40 further includes flow control valve 46, aqueous inlet 48 and mixing device 50. The mixing device is positioned within the cavity 42 of the vessel, in the configuration shown, and may comprise a static mixer, for example or a baffle mixer. In other configurations, a recirculation may be provided, and a shear mixer can be utilized. The separate mixer allows for a different ratio of aqueous within the mixer as compared with the reactor. That is, a different ratio of aqueous to liquid hydrocarbon can be presented within the mixer as compared to the reactor, and, for example, a greater amount of aqueous relative to liquid hydrocarbon can be utilized in the mixer.

The separator 60, in the configuration shown, comprises a vessel defining cavity 62. The separator 60 includes inlet 64, fuel outlet 66 and aqueous outlet 68, all of which are in fluid communication with the separator cavity 62.

The reactor 20, mixer 40 and separator 60 can be selectively placed in fluid communication with each other. For example, inlet 34 directs fuel and/or oxidant (which can be added through 34') into the recirculation loop. The outlet 36 (that branches from the recirculation loop) is in fluid communication with the recirculation loop that recirculates back to the cavity 22 and the flow control valve 46, which, in turn, is in fluid communication with inlet 44 and aqueous inlet 48. The outlet 52 of the mixer is in fluid communication with the inlet 64 of the separator.

In the configuration shown, the second and third processing units have similar components, and, where the components have similar functions and the like, the same reference number has been utilized, augmented by 100 for the second processing unit and augmented by 200 for the third processing unit. As set forth above, there is no limit on the number of processing units, in some cases, a single processing unit may be utilized, whereas in other cases more than two processing units may be utilized (i.e., 3, 4, 5, 6, 7, 8, 9, 10, 11, 12, 13, 14, and even more processing units). The processing units are arranged serially, while it will be understood that the processing units may be arranged in a series/parallel configuration.

For purposes of the description, the second processing unit is the subsequent processing unit for the first processing unit, and the first processing unit is the preceding processing unit for the second processing unit. It will also be noted that preceding and subsequent is defined by the direction of the flow of fuel (with the understanding that the aqueous travels in a direction opposite that of the fuel in the configuration shown). In the configuration shown, the fuel outlet of a separator of one of the processing units is in fluid communication with the subsequent recirculation loop (or directly to the reactor cavity) of the reactor of a subsequent processing unit, until the final unit, wherein the fuel outlet of the separator is transferred to a sorption system which can remove the oxidized sulfur from the fuel. Similarly, the aqueous outlet of a separator of one of the processing units is in fluid communication with the aqueous inlet of a mixer of a preceding processing unit. If the processing unit is the first processing unit, then the aqueous outlet can be coupled to the aqueous inlet of the mixer of the last processing unit, or may be sent to a recycling station (not shown). If the processing unit is the final processing unit, fresh aqueous may be provided from a fresh aqueous vessel or the like (not shown), or, as set forth above, may be in fluid communication with the aqueous outlet of the separator of the first processing unit. Variations are contemplated to the above-identified configurations. However, in such a configuration as described, the fuel proceeds in a direction opposite that of the aqueous.

When steady state operation is reached (and, it will be understood that it may be necessary to prime the system first), the operation will track the fuel as the fuel proceeds from the first processing unit to the final processing unit. Specifically, new fuel and additional oxidant is provided through inlet 34 to the recirculation loop. As the fuel and oxidant circulate in the reactor and the recirculation loop, the shear device provides the necessary intermingling and mixing of the constituents. As desired, through the flow control valve, the fuel and oxidant are removed from the recirculation loop and directed into the mixer 40. At the same time, aqueous in directed through the aqueous inlet 48 into the mixer as well. It will be understood that generally, the aqueous is maintained at the same or similar temperatures and pressures as the reactor (while variations are envisioned). The fuel and oxidizer is mixed with the aqueous within the mixer. Once mixed for a predetermined period of time, the mixture is transferred to the separator 60. As the contents stay in the separator, they separate into their constituent parts, with the fuel floating on top of the aqueous. Again, it will be understood that generally, the mixed fuel and aqueous in the separator are maintained at the same or similar temperature as in the reactor and the mixer (again, variations are envisioned). Once sufficiently separated, the aqueous is removed through the aqueous outlet, and the fuel is removed through the fuel outlet.

As set forth above, the aqueous can be directed to, for example, an aqueous recycling. The fuel is directed to the reactor 120 of the second processing unit and recirculates with additional oxidant that is introduced with the fuel at inlet 134. It will be understood that the fuel introduced into the second reactor vessel includes oxidized sulfur therewithin. As with the first processing unit, the fuel and oxidizer is circulated through the recirculation loop for a predetermined period of time. The flow control valve 146 removes a desired quantity (or a has a desired flow rate) of the intimately mixed oxidant and fuel introduces the same into the mixer at inlet 144. At the same time, aqueous is introduced through the aqueous inlet 48. In the mixer, the fuel and oxidant that was intimately mixed is further mixed with the aqueous. Once mixed for a desired period of time, the mixture is transferred to the separator 160. As explained above, in the separator the aqueous and the fuel separate. The aqueous is directed through the aqueous outlet 168 to the aqueous inlet 48 of the mixer of the first processing unit.

The fuel is removed through the fuel outlet 166 and introduced to the reactor of the third processing unit. Specifically, along with further oxidant, the fuel and oxidant are added at inlet 234 to the recirculation loop. Once intimately mixed, through the flow control valve 346, the fuel and oxidant are directed into the mixer at inlet 244. Aqueous is directed (either from the aqueous outlet 68 of the separator 60 of the first processing unit, or, from another source of aqueous) through aqueous inlet 248 into the mixer inlet 244 where the constituents are mixed for a desired amount of time. Once mixed as desired, the mixture is removed through outlet 252 and introduced into the separator 260 through inlet 264. Once separated, the aqueous is directed through the aqueous outlet 268 and into the aqueous inlet 148 of the second processing unit. The fuel is removed through the fuel outlet 266 and directed to a stripper or sorbent system (the oxidized sulfur species removal unit 14, for example), wherein the oxidizes sulfur species can be removed.

It will be understood that, typically, once steady state is achieved, it may be necessary only to add oxidant into the system at 34', 134' and/or 234'. Additionally, it will be understood that such oxidant may be added with aqueous that is taken, for example, from outlet 68, 168 or 268. For example, the oxidant that is utilized in 34' may be supplied with aqueous that is new, or from aqueous from any of the foregoing locations.

It will be understood that the system described therein preferably does not remove oxidized sulfur species created in any one of the processing units until the fuel (and oxidized sulfur species) are removed from the fuel outlet of the last processing unit. It has been found that the oxidized sulfur species can be permitted to remain with the fuel through each of the processing units, and, with the addition of aqueous to each of the processing units (preferably in a reverse flow manner, i.e., reverse to the flow direction of the fuel) and oxidant, the reaction to oxidize the sulfur species will continue and not reach an equilibrium state (wherein further oxidation substantially or completely ceases to occur). Thus, preferably, the oxidizing of the sulfur species continues from processing unit to processing unit without the need to remove the oxidized sulfur species between any one of (or at any one of) the processing units.

It will be understood that the fresh aqueous composition introduced at 248 is generally clean fresh water, ranging from approximately 5.5 µS/m to 50 mS/m. To this, other components can be added, such as the above-described carboxylic acids, to minimize loss of the reagents during the process (with variations contemplated). It will further be understood that the aqueous introduced at 248 may comprise recycled aqueous from outlet 68 (or other locations in the system, such as 168 or 268).

In various configurations, the ratio of aqueous to fuel is between two parts $H_2O$ to one part fuel to one part $H_2O$ to sixteen parts fuel (while other variations are contemplated) in the reactor and in the mixer. In some configurations, the ratio may be different in the mixer, such as for example, well in excess of two parts water to one part fuel, depending on the configuration. The aqueous can be recirculated from the portion 68 to the portion 248 if desired, thus providing another source of reagents. In such a configuration, the water created by the decomposition of the peroxide is typically removed to maintain the ratios identified above between water ($H_2O$) and fuel.

While not limited to the foregoing explanation, it is believed that the use of the aqueous can be to prevent the oxidation reduction equilibrium from taking place so that oxidation occurs relatively quickly and substantially to completion. Additionally, and without being limited to the foregoing explanation, it is believed that the metal ions (oxidized) are used to perform the same duty so as to delay equilibrium. In other words, it is believed that these constituents allow for the continued oxidation of the sulfur species.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

The invention claimed is:

1. A method of liquid hydrocarbon desulfurization comprising the steps of:
   providing a first processing unit and a second processing unit, each processing unit having a reactor, a mixer and a separator, wherein the reactor is placeable in fluid communication with the mixer, and the mixer is in fluid communication with the separator;
   introducing a liquid hydrocarbon having a sulfur content into the reactor of the first processing unit;
   introducing an aqueous feed into the reactor of the first processing unit;
   mixing the liquid hydrocarbon with the aqueous feed in the reactor to form a first mixture;
   oxidizing at least some of the sulfur content in the liquid hydrocarbon within the reactor of the first processing unit;
   moving the liquid hydrocarbon and aqueous feed from the reactor to the mixer of the first processing unit;
   adding an additional aqueous feed to the mixer of the first processing unit;
   mixing the liquid hydrocarbon, aqueous feed and the additional aqueous feed in the mixer to form a second mixture;
   moving the second mixture to the separator of the first processing unit;
   separating the liquid hydrocarbon from the aqueous feed in the first processing unit;
   directing the liquid hydrocarbon to the reactor of the second processing unit;
   introducing an aqueous feed into the reactor of the second processing unit;
   mixing the liquid hydrocarbon with the aqueous feed in the reactor to form a third mixture;
   oxidizing at least some of the sulfur content in the liquid hydrocarbon within the reactor of the second processing unit;
   moving the liquid hydrocarbon and aqueous feed from the reactor to the mixer of the second processing unit;
   adding an additional aqueous feed to the mixer of the second processing unit;
   mixing the liquid hydrocarbon, aqueous feed and the additional aqueous feed in the mixer to form a fourth mixture;
   moving the fourth mixture to the separator of the second processing unit; and
   separating the liquid hydrocarbon from the aqueous feed in the second processing unit.

2. The method of claim 1 wherein the step of adding an additional aqueous feed to the mixer of the first processing unit further comprises the step of:
   adding an additional aqueous feed to the mixer of the first processing unit from the separator of the second processing unit.

3. The method of claim 1 wherein the aqueous feed further comprises a metal ion.

4. The method of claim 1 wherein the oxidant further comprises at least one of hydrogen peroxide, an organic peroxide, meta-chloroperoxybenzoic acid, a solid oxidizer, and Oxone.

5. The method of claim 1 wherein the liquid hydrocarbon travels from the first processing unit to the second processing unit while the additional aqueous travels from the second processing unit to the first processing unit.

6. The method of claim 1 wherein the steps of introducing the liquid hydrocarbon and the steps of removing the first and third mixtures occur continuously.

7. The method of claim 1 further comprising the step of providing additional oxidant to the reactor of the second processing unit.

8. The method of claim 1 wherein the reactor of the first processing unit and the reactor of the second processing unit each include a recirculation loop.

9. The method of claim 1 further comprising the steps of:
   removing the oxidized sulfur from the liquid hydrocarbon after the step of separating the liquid hydrocarbon from the aqueous feed in the second processing unit.

10. The method of claim 1 wherein the liquid hydrocarbon provided to the reactor of the first processing unit has a sulfur content of in excess of 100 ppm.

11. The method of claim 10 wherein the liquid hydrocarbon provided to the reactor of the first processing unit has a sulfur content of in excess of 900 ppm.

12. A method of liquid hydrocarbon desulfurization comprising the steps of:
   providing a first processing, a last processing unit and at least one intermediate processing unit, each of the first, last and at least one intermediate processing units having a reactor, a mixer and a separator;
   providing an aqueous feed to each of the processing units;
   providing a liquid hydrocarbon having a sulfur content to the first processing unit;
   sequentially moving the liquid hydrocarbon successively through the at least one intermediate processing unit and through the last processing unit;
   adding additional aqueous feed to the mixer of at least one of the processing units;
   oxidizing at least some of the sulfur content in each of the processing units; and
   removing the oxidized sulfur from the liquid hydrocarbon after the last processing unit.

13. The method of claim 12 wherein the step of adding additional aqueous feed comprises the step of adding additional aqueous feed to each of the processing units.

14. The method of claim 13 wherein the step of adding additional aqueous feed comprises the step of sequentially moving the additional aqueous feed from the last processing unit through the at least one intermediate processing unit and through the first processing unit.

15. The method of claim 12 further comprising the step of adding an oxidizer to the reactor of at least one of the first processing unit, the last processing unit and the at least one intermediate processing unit.

16. The method of claim 12 wherein the step of removing the oxidized sulfur occurs only with liquid hydrocarbon that is removed from the last processing unit.

17. The method of claim 12 wherein oxidized sulfur is not removed from the liquid hydrocarbon between the first processing unit, the at least one intermediate processing unit and the last processing unit.

18. A system for liquid hydrocarbon desulfurization comprising:
   at least two processing units, each processing unit further including:
   a reactor, having a reactor inlet, a reactor outlet and a reactor mixing member;

a mixer, having a mixer inlet, a mixer outlet and a second mixing member; and a separator having a separator inlet, a separator aqueous outlet and a separator fuel outlet, wherein the reactor outlet is in fluid communication with the mixer inlet and the mixer outlet is in fluid communication with the separator inlet, wherein the separator aqueous outlet of a second of the at least two processing units is in fluid communication with the mixer inlet of the first of the at least two processing units and the separator fuel outlet of a first of the at least two processing units is in fluid communication with the reactor inlet of the first of the at least two processing units.

19. The system of claim 18 wherein a flow control valve is positioned between the reactor outlet and the mixer inlet of each of the at least two processing units.

20. The system of claim 19 wherein the reactor mixing member further includes a recirculation loop, the recirculation loop having a shear mixer.

* * * * *